United States Patent [19]

Sullivan

[11] Patent Number: 5,052,528
[45] Date of Patent: Oct. 1, 1991

[54] STEERING KNUCKLE DAMPER

[75] Inventor: James L. Sullivan, Rochester, Mich.

[73] Assignee: Rockwell International Corporation, Pittsburgh, Pa.

[21] Appl. No.: 563,478

[22] Filed: Aug. 6, 1990

[51] Int. Cl.5 .............................................. F16F 5/00
[52] U.S. Cl. ................................. 188/317; 188/282; 188/286; 188/322.22; 188/322.19; 267/221; 267/226; 280/90; 280/93; 280/673
[58] Field of Search ........................... 188/316–318, 188/281–282, 283, 284, 285, 286, 311, 322.22, 313–315, 322.11, 321.11, 322.15, 322.13, 322.14, 322.19, 322.16, 322.18, 62; 280/93, 90, 673, 272, 89, 90; 267/217, 221, 226, 139, 119, 130, 70–74, 69; 180/257

[56] References Cited

U.S. PATENT DOCUMENTS

| | | | |
|---|---|---|---|
| 2,360,755 | 10/1944 | Boor | 188/286 |
| 3,049,938 | 8/1962 | Hulten et al. | 280/89 X |
| 3,201,110 | 8/1965 | Taccone | 267/226 X |
| 3,379,455 | 4/1968 | Dahlstrom | 280/89 |
| 3,494,606 | 2/1970 | Hanchen | 267/226 X |
| 3,693,767 | 9/1972 | Johnson | 188/318 X |
| 3,885,776 | 5/1975 | Blatt | 267/139 X |
| 3,892,437 | 7/1975 | Makinen | 188/286 X |
| 4,018,428 | 4/1977 | Weir | 267/226 |
| 4,500,075 | 2/1985 | Tsuchiya et al. | 267/226 |
| 4,588,171 | 5/1986 | Stephens | 188/318 X |
| 4,653,773 | 3/1987 | Graff | 180/257 |
| 4,721,189 | 1/1988 | Bick | 188/62 |

Primary Examiner—Douglas C. Butler

[57] ABSTRACT

A limited stroke hydraulic actuator which may be located in the structure of a steered axle in a shallow blind bore. The piston which may be slidably received in the bore is displaced by an adjustable protrusion secured to the steering system. Displacement of the piston causes hydraulic fluid to flow through an orifice from one side to the other. Resistance to flow of fluid through the orifice damps the motion of the piston and consequently the steering system. A spring returns the piston to an initial position when the steering system is removed from end of travel position.

8 Claims, 2 Drawing Sheets

STEERING KNUCKLE DAMPER

FIELD OF THE INVENTION

This invention relates to vehicle steering systems; and more particularly, steering systems incorporating a hydraulic damper for controlling end of travel steering motion.

BACKGROUND OF THE INVENTION

A vehicle steering system turned to full lock position, left or right, encounters physical limitations which result in structural stresses to the steering axle as well as the steering system itself. This impact produces physical stresses which must be anticipated at the time of design. As a result, additional reinforcement material is required in the steering system as well as in the respective abutting suspension components.

A present solution to this situation is to incorporate a hydraulic cylinder which travels with the steering system and comes to a gradual hydraulic lock when the steering system reaches end of travel. The cylinder is an add-on device which must be secured to the vehicle suspension at one end and to the steering system at the other. The cylinder travels the full stroke of the steered motion applying a constant damping force. The cylinder must be capable of travel equal to the linear displacement of the steering system. In addition the cylinder must travel with the suspension system and therefore may be damaged by obstructions encountered on the roadway. Therefore there is a need for a compact modular steering knuckle shock absorber to damp the force which is encountered as the steering system reaches end of travel.

SUMMARY OF THE INVENTION

The preferred embodiment of the present invention is a limited stroke hydraulic actuator which may be integrated in the structure of a steered axle in a shallow blind bore formed therein. A piston slidably received in the bore is displaced by an adjustable protrusion secured to the steering knuckle. Displacement of the piston causes hydraulic fluid to flow through orifices from one working chamber to another. Resistance to flow of fluid through the orifices damps the motion of the piston and, consequently, the steering system. A spring is compressed upon displacement of the piston and acts to return the piston to an initial position when the steering system is removed from end of travel position.

In the preferred embodiment, the invention includes a damper for absorbing the impact of the steering knuckle against a structural member of the steering axle further comprising a close ended bore formed integrally within the structural member having a bottom portion and a cylindrical portion. The close ended bore has a top member having an opening defined therein. The top member is placed in the bore sealingly connected to the cylindrical portion thereof. A piston is placed in the bore such that a flange portion of the piston is sealingly contacting the cylindrical portion of the close ended bore. The piston has a rod portion sealingly engaging the opening defined in the top member. The top member, the cylindrical portion of the close ended bore, and the piston form a first annular working chamber. The bottom and cylindrical portion of the close ended bore and the piston form a second annular working chamber. A fluid is placed in the first and second chambers. The flange portion of the piston has a fluid flow orifice formed therein to enable fluid flow between the first and second chambers. A spring imparts a resilient force on the piston to define an initial position. Finally, a stop located on the steering knuckle may be positioned to engage the piston and displace the piston from the initial position to a second position whereby the impact of the stop member against the structural member is damped by the forces encountered as fluid flows between the first and second chambers.

In another embodiment, the present invention includes a damper for absorbing the impact of a steering knuckle against a structural member of a steering axle comprising a close ended bore formed integrally within the structural member having a bottom wall and a cylindrical wall. The cylindrical wall has two portions, a first enlarged bore and a second threaded bore. A sleeve is threadably received in the threaded bore portion. The sleeve extends partially into the enlarged bore portion. The sleeve includes a cylindrical internal diameter and top portion having a bore formed therein. A piston is placed in the bore having a flange portion sealingly engaging the cylindrical wall thereof. The piston has a rod portion connecting to the flange portion and sealingly engaging the bore formed in the top portion of the sleeve. The piston, the cylindrical internal diameter of the sleeve and the enlarged bore portion of the close ended bore form the first working chamber. The piston, the cylindrical internal diameter of the sleeve and the top portion of the close ended bore define a second working chamber. A fluid is placed in the first and second working chambers. A fluid orifice is defined in the flange portion of the piston to permit the flow of fluid between the first and second chambers. A spring imparting a resilient force upon the piston defines an initial position for the piston. Finally, a stop member located on the steering knuckle is arranged to engage the piston and displace the piston from an initial position to a second position whereby the impact of the stop member against the structural member is damped by the forces encountered as fluid flows between the first and second chambers.

These and other aspects of the present invention will become more readily apparent by reference to the following detailed description of the embodiments as shown in the drawings.

DESCRIPTION OF THE PREFERRED EMBODIMENT

Figure 1:
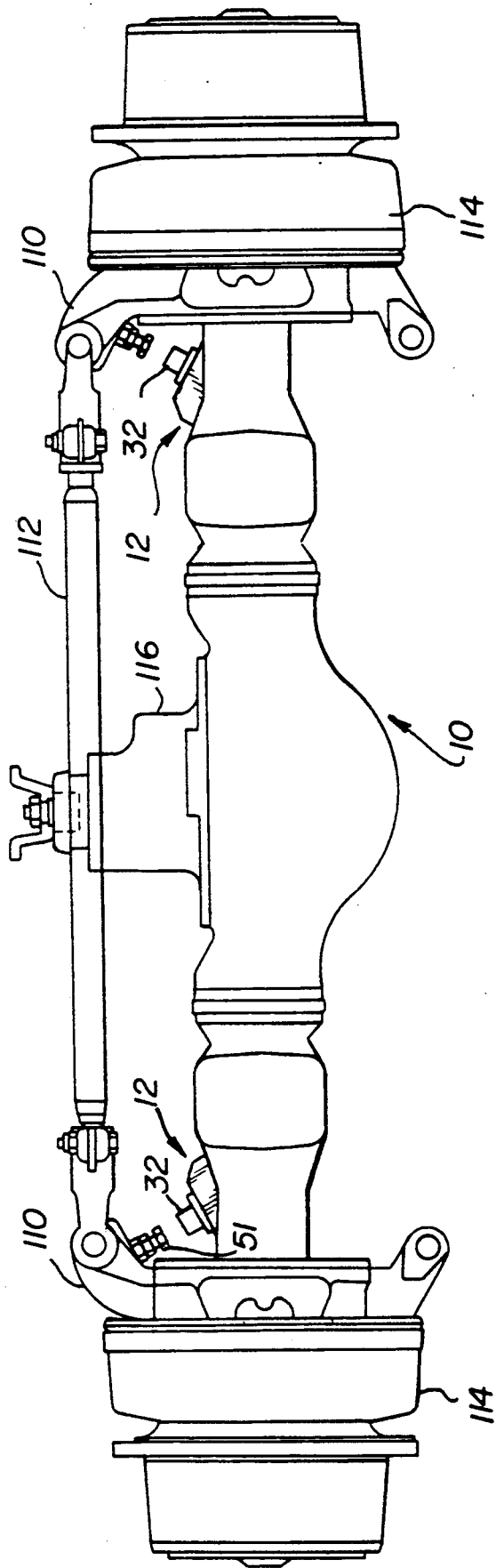
FIG. 1 is an enlarged section of the damper of the present invention installed on a steering axle.

The present invention comprises a steerable axle as shown in FIG. 1 including axle housing 10, having pivotable steering knuckles 110, 110' connected by a tie rod 112. Brake drums 114, 114' are adapted for mounting road wheels (not shown). In the example illustrated in FIG. 1, a differential 116 is included to transmit motive force to the respective vehicle wheels. The axle housing 10 includes a damper assembly 12 formed integrally with said housing or adapted as a subsequent enhancement thereto. The damper assembly 12 has a piston including rod portion 32 extending therefrom for abutting engagement with steering knuckle stop 51.

Figure 2:
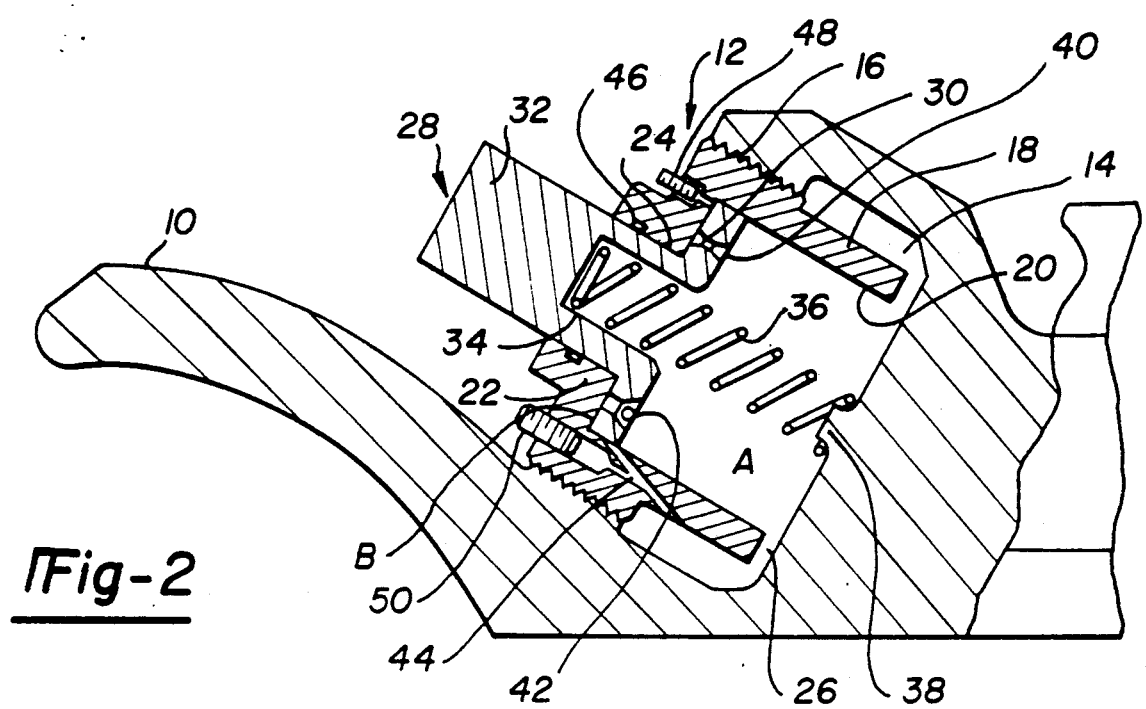
FIG. 2 is a cross-section of the present invention shown in an initial position.

Damper assembly 12 as shown in FIG. 2 has a bore having two portions; a first enlarged portion 14 and a second threaded portion 16. A sleeve 18 is threadably received in threaded portion 16 and retained therein by suitable thread locking techniques. Sleeve 18 includes a cylindrical internal portion 20 and a top portion 22 having bore 24. It may be noted that passage/clearance 26 between sleeve 18 and enlarged portion 14 provides for bi-directional flow of fluid therethrough. Piston 28 has a flange portion 30 and a rod portion 32. A central close ended bore 34 and raised protrusion 38 extending from the bottom of enlarged portion 14, provide positioning for spring 36. Orifice 40 permits flow of fluid across flange portion 30 of piston 28. It may be noted that flow is enabled in either direction through orifice 40. Check valve 42 disposed in flange portion 30 of piston 28 permits flow of fluid in one direction only. A second orifice 44 in sleeve 18 provides an alternate path across the flange portion 30 of piston 28 after the piston has been displaced from the initial position shown in FIG. 3. It may be noted that upon initial application of force to piston rod 32 all fluid will flow from working chamber A to working chamber B (shown as collapsed in FIG. 3) through orifice 40. After flange portion 30 of piston 28 has been displaced so as to expose second orifice 44, fluid flow will be split between orifice 40 and orifice 44. Thus, during initial displacement of piston 28, damping will be greater than the damping provided as the damper moves through the remainder of the stroke. The piston 28 will reach end of travel (as shown in FIG. 4) when chamber A is completely collapsed and all of the fluid has been transmitted to chamber B.

Flange portion 30 of piston 28 engages cylindrical inner diameter 20 of sleeve 18 by means of tight low clearance fit. Portion 32 of piston 28 engages bore 24 of top portion 22 and is sealed thereagainst by O-ring 46. Threaded nipples 48 and 50 are used to fill and/or bleed the working chambers of the damper. Steering stop 51, provided on steering knuckle 110 may be adjusted by releasing locking nuts 112, 112' and adjusting steering stop 51 to the appropriate extended position.

Figure 3:
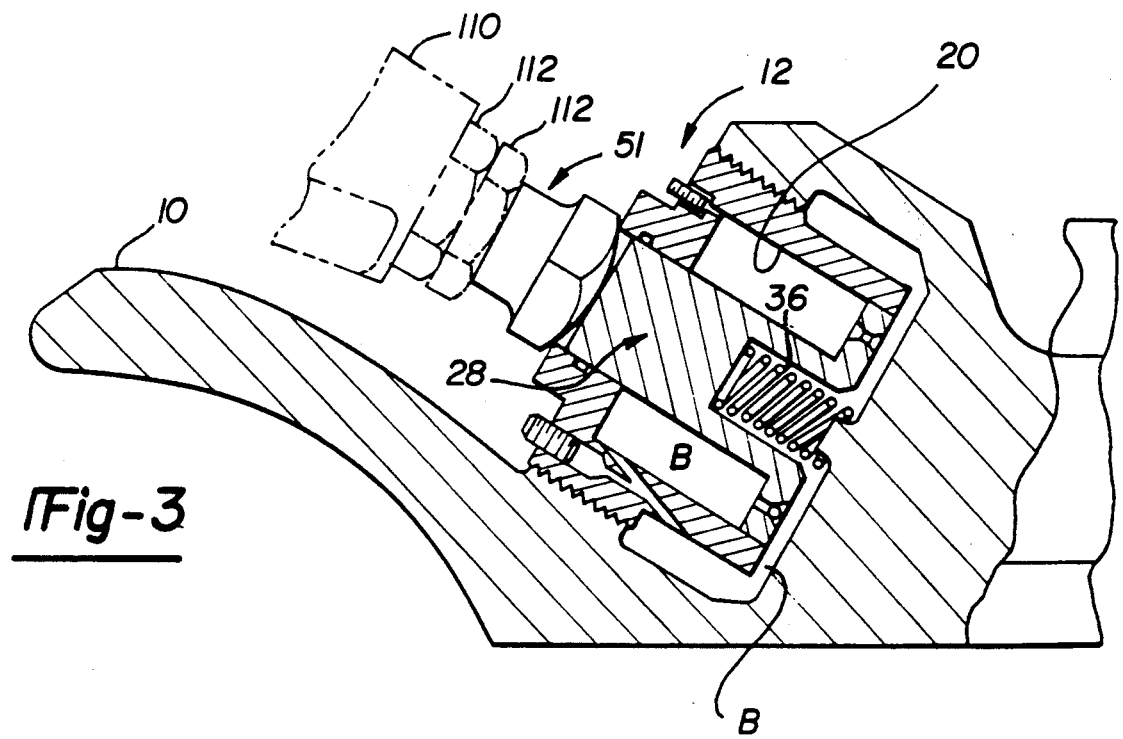
FIG. 3 is a cross-section of the present invention shown in a contracted position.

In operation the damper as shown in FIG. 3 is fully extended with spring 36 at minimum compression. As the steering knuckle is rotated in a steering maneuver, steering stop 51 will approach piston rod 28 eventually making contact thereagainst. During initial compression of piston 28, steering stop 51 will encounter a maximum damping force. After flange portion 30 of piston 28 has been displaced an initial distance exposing second orifice 44, the damping force from the third forces will be slightly reduced. If the steering system is steered with high force against the damper 12, steering stop 51 will force piston 28 to bottom, as shown in FIG. 3. When the steering maneuver has been completed and steering stop 51 is steered in a direction away from damper 12, spring 36 will return piston 28 to initial position. Travel to the initial position from a fully collapsed position causes fluid flow through first orifice 40, check valve 42, as well as second orifice 44. As the flange portion 30 of piston 28 reaches the initial position, second orifice 44 will be covered effectively preventing flow of fluid therethrough. In this manner, return travel of piston 28 will be slowed preventing it from abruptly stopping against top portion 22.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A damper for absorbing the impact of a steering knuckle against a structural member of a steering axle comprising;
   a close ended bore formed integrally within said structural member having a bottom portion and a cylindrical portion;
   a top member having an opening defined therein disposed in said bore and sealingly connected to said cylindrical portion of said bore;
   a piston disposed in said bore and having a flange portion sealingly received in said cylindrical portion;
   said piston having a rod portion sealingly received in said opening defined in said top member;
   said top member, said cylindrical portion of said bore and said piston forming a first annular working chamber;
   said bottom and cylindrical portion of said bore and said piston forming a second annular working chamber;
   a fluid disposed in said first and second chambers;
   said flange portion of said piston having a first fluid flow orifice formed therein to enable fluid flow between said first and said second chambers;
   a spring imparting resilient force on said piston to define an initial position; and
   a stop member disposed on said steering knuckle for engaging said piston and displacing said piston from said initial position to a second position whereby the impact of said stop member against said structural member is damped by the forces encountered as fluid flows between said first and second chambers.

2. The invention of claim 1 further comprising a second fluid flow orifice defined in said cylindrical portion of said bore between said first and second chambers.

3. The invention of claim 2 wherein said second orifice is blocked by said flange portion of said piston when said piston is in said initial position.

4. The invention of claim 1 wherein said flange portion includes a check valve permitting free flow of fluid from said first to said second chamber thereby facilitating return to initial position upon release of force applied by said stop member.

5. A damper for absorbing the impact of a steering knuckle against a structural member of a steering axle comprising:
   a close ended bore formed integrally within said structural member having a bottom wall and a cylindrical wall;
   said cylindrical wall having two portions, a first enlarged bore and a second threaded bore;
   a sleeve threadably received in said threaded bore portion and extending partially into said enlarged bore portion having a cylindrical internal diameter and a top portion having a bore formed therein;
   a piston disposed in said bore having a flange portion sealingly engaging said cylindrical wall;

said piston also having a rod portion connecting with said flange portion sealingly engaging said bore formed in said top portion of said sleeve;

said piston, said cylindrical internal diameter and said enlarged bore defining a first working chamber;

said piston, said cylindrical internal diameter and said top portion of said sleeve defining a second working chamber;

a fluid disposed in said first and second chambers;

said flange portion having a first fluid orifice defined therein to permit the flow of fluid between said first and second chambers;

a spring imparting a resilient force upon said piston to define an initial position for said piston; and a stop member disposed on said steering knuckle for engaging said piston and displacing said piston from said initial position to a second position whereby the impact of said stop member against said structural member is damped by the forces encountered as fluid flows between said first and second chambers.

6. The invention of claim 5 further comprising a sleeve having a second fluid flow orifice formed therein which permits fluid flow between said first and second chambers.

7. The invention of claim 6 wherein said second orifice is blocked by said flange portion of said piston when said piston is in said initial position.

8. The invention of claim 5 wherein said flange portion includes a check valve permitting free flow of fluid from said first to said second chamber thereby facilitating return of said piston to initial position upon release of force applied by said stop member.

* * * * *